United States Patent [19]
Noh

[11] Patent Number: 5,291,321
[45] Date of Patent: Mar. 1, 1994

[54] METHOD AND APPARATUS FOR MAKING HOLOGRAM

[75] Inventor: Sung W. Noh, Seoul, Rep. of Korea

[73] Assignee: Goldstar Co., Ltd., Seoul, Rep. of Korea

[21] Appl. No.: 971,557

[22] Filed: Nov. 5, 1992

[30] Foreign Application Priority Data

Nov. 5, 1991 [KR] Rep. of Korea .............. 19579/1991

[51] Int. Cl.$^5$ .................. G03H 1/00; G03H 1/02
[52] U.S. Cl. ................................ 359/30; 359/1; 359/31; 359/10; 359/28
[58] Field of Search ............. 359/30, 31, 1, 9, 10, 359/11, 12, 21, 28

[56] References Cited

PUBLICATIONS

Definsive publication Lanteigne, application Ser. No. 386,323, filed Jul. 28, 1989, laid open to public inspection on Nov. 6, 1990.

Primary Examiner—Scott J. Sugarman
Assistant Examiner—Thomas D. Robbins

[57] ABSTRACT

A method and an apparatus for making a hologram wherein interference patterns to be recorded on a hologram plate are prevented from travelling, thereby enabling a high quality hologram to be made. The method comprises the steps of forming a monitoring hologram on a portion of the hologram plate, producing a monitoring beam based on a laser beam, splitting the laser and monitoring beams into two beams, respectively, producing object, reference, monitoring object and monitoring reference beams, allowing the monitoring object and reference beams to be incident on the monitoring hologram to form monitoring interference patterns, sensing an intensity of the monitoring interference patterns, comparing the sensed intensity with a reference intensity, if the intensity is varied exceeding a tolerance limit of the intensity variation, blocking the laser beam and allowing the monitoring object beam and the monitoring reference beam to be incident on the monitoring hologram, if not so, allowing the object beam and the reference beam to be incident on the hologram plate, and performing repeatedly the sensing and comparing steps so that the object beam and the reference beam are incident on the hologram plate only for a predetermined time period to record the hologram based on an interference phenomenon thereof.

16 Claims, 3 Drawing Sheets

METHOD AND APPARATUS FOR MAKING HOLOGRAM

BACKGROUND OF THE INVENTION

1. Field of the Invention

The present invention relates in general to making a hologram, and more particularly to a method and an apparatus for making a hologram wherein interference patterns to be recorded on a hologram plate are prevented from travelling to be efficiently modulated, thereby generating a high quality hologram.

2. Description of the Prior Art

Referring to FIG. 1, there is shown an arrangement of a conventional apparatus for making a transmissive hologram. As shown in this drawing, the conventional apparatus comprises a laser 11 as a light source, a shutter 12 for blocking or passing a laser beam L being emitted from the laser 11, a beam splitter 13 for splitting the laser beam L passed through the shutter 12 into two beams L1 and L2, reflection mirrors 14 and 15 for reflecting the beams L1 and L2 split by the beam splitter 13 at desired angles, respectively, a beam expander 16 and a lens 17 for producing an object beam Lo by expanding a diameter of the reflected beam L1 to allow the reflected beam L1 to light a desired area, a beam expander 18 and a lens 19 cooperative with each other for producing a reference beam Lr by expanding a diameter of the reflected beam L2 to allow the reflected beam L2 to light the same area as that of the reflected beam L1, and a hologram plate 20 for forming interference patterns 21 thereon based on an interference phenomenon of the object beam Lo and the reference beam Lr incident thereon, to record the hologram thereon.

The operation of the conventional transmissive hologram making apparatus with the above mentioned construction will hereinafter be described.

The laser beam L emitted from the laser 11 as a light source is blocked or passed according to an operating state of the shutter 12. Namely, when the shutter 12 is turned on, the laser beam L emitted from the laser 11 is applied through the turned-on shutter 12 to the beam splitter 13, which splits the laser beam L into the two beams L1 and L2 which are then reflected at their desired angles by the reflection mirrors 14 and 15, respectively.

The reflected beams L1 and L2 are altered, respectively, into the object beam Lo and the reference beam Lr, with the diameters thereof being expanded by the beam expanders 16 and 18 and the lenses 17 and 19, in order to light desired areas of the hologram plate 20. The object beam Lo and the reference beam Lr are incident on the hologram plate 20 at their desired angles.

In the above structure, if desired, the lenses 17 and 19 may be omitted and an object, an image of which is to be recorded, may be used instead such that a beam transmitted to or dispersed by the object is used as the object beam.

The object beam Lo and the reference beam Lr incident on the hologram plate 20 form a series of black and dark portions, or the optical interference patterns 21 on the hologram plate 20 based on an interference phenomenon. The formed interference patterns 21 are recorded on the hologram plate 20.

The process of recording the interference patterns 21 on the hologram plate 20 will hereinafter be described.

As the laser beam L from the laser 11 is passed through the shutter 12 in the turned-on state, a point P on the hologram plate 20 is exposed to the object beam Lo and the reference beam Lr. Present at the point P on the hologram plate 20 is an intensity I(P) resulting from the interference phenomenon of the object beam Lo and the reference beam Lr. Assuming that the time for which the laser 11 is at its ON state is T, energy at the point P on the hologram plate 20 can be expressed by the following equation:

$$E = I(P) \cdot T \tag{1}$$

From the above equation (1), it can be seen that the point P on the hologram plate 20 is subject to the energy as much as $E = I(P) \cdot T$. As a latent image resulting from the energy is developed, it is recorded as the interference patterns 21 based on a variation in an optical nature on the hologram plate 20.

It is impossible to make a direct observation on the interference patterns 21 on the hologram plate 20 since adjacent ones of the interference patterns 21 are arranged to have, typically, an interval of 1 μm with respect to each other.

In making the hologram as mentioned above, assuming that dl1 and dl2 are, respectively, paths along which the laser beam L from the laser 11 is split into the two beams L1 and L2 by the beam splitter 13 and then incident on the point P on the hologram plate 20, λ and is a wavelength of the laser beam L, a path difference δ and a phase difference Δφ between the two beams L1 and L2 can be expressed by the following equations:

$$\delta = dl1 - dl2$$

$$\Delta\phi = 2\pi \cdot [(dl1 - dl2)/\lambda] \tag{2}$$

The intensity of the beams being, in a moment, incident on the point P on the hologram plate 20 is determined based on the phase difference Δφ in the above equation (2).

That is, if $\Delta\phi = 2n\pi$, then $I(P) = Imax$, and if $\Delta\phi = (2n+1)\pi$, then $I(P) = Imin = 0$ For this reason, in order to accurately record the hologram on the hologram plate 20, the intensity of the beams incident on the hologram plate 20 must be maintained accurately and constantly for the exposure time T of the shutter 12 required to record the hologram. However, the paths dl1 and dl2 along which the laser beam L from the laser 11 is split into the two beams L1 and L2, altered into the object beam Lo and the reference beam Lr and then incident on the point P on the hologram plate 20 are liable to be varied for the exposure time T of the shutter 12, because of air flow and fine moving of the reflection mirrors 14 and 15, the beam expanders 16 and 18 and the lenses 17 and 19. As the beam incident paths dl1 and dl2 are varied, the phase difference Δφ between the two beams L1 and L2 is varied, thereby causing the beam intensity I(P) at the point P on the hologram plate 20 to be varied.

The variation of the beam intensity I(P) at the point P on the hologram plate 20 for the exposure time T of the shutter 12 signifies travelling of the interference patterns 21 to be recorded on the hologram plate 21 for that time. The travelling of the interference patterns results in a degradation of the hologram to be finally obtained. For the purpose of preventing such degradation, it may be required to minimize the exposure time T of the shutter 12 to remove an external disturbance for that time. However, the exposure time may run into several seconds to several minutes if desired. As a result, the degradation problem cannot be solved without an accurate control for the positions of the optical elements through which the laser beam is passed.

SUMMARY OF THE INVENTION

Therefore, the present invention has been made in view of the above problem, and it is an object of the present invention to provide a method and an apparatus for making a hologram wherein a monitoring hologram is formed on a portion of a hologram plate and a variation in an intensity of monitoring interference patterns thereof is sensed such that a shutter is controlled according to the sensed intensity variation, so that interference patterns to be recorded on the hologram plate are prevented from travelling, thereby enabling a high quality hologram to be made.

In accordance with one aspect of the present invention, the above object can be accomplished by a method of making a hologram, comprising the steps of: forming a monitoring hologram on a portion of a hologram plate; producing a monitoring beam based on a laser beam; splitting said laser beam and said monitoring beam into two beams, respectively; producing an object beam and a reference beam to be incident on the whole surface of said hologram plate from said two beams into which said laser beam is split and a monitoring object beam and a monitoring reference beam to be incident on said monitoring hologram on said hologram plate from said two beams into which said monitoring beam is split; allowing said monitoring object beam and said monitoring reference beam to be incident on said monitoring hologram on said hologram plate to form monitoring interference patterns; sensing an intensity of said monitoring interference patterns; comparing the sensed intensity of said monitoring interference patterns with a reference intensity; if the intensity of said monitoring interference patterns is varied exceeding a tolerance limit of the intensity variation, blocking said laser beam and allowing said monitoring object beam and said monitoring reference beam to be incident on said monitoring hologram on said hologram plate; if the intensity of said monitoring interference patterns is varied within the tolerance limit of the intensity variation, allowing said object beam and said reference beam to be incident on said hologram plate; and performing repeatedly said sensing and comparing steps so that said object beam and said reference beam are incident on said hologram plate only for a predetermined time period to record said hologram based on an interference phenomenon thereof.

In accordance with another aspect of the present invention, the above object can be accomplished by a provision of an apparatus for making a hologram, comprising: a laser as a light source; a shutter for blocking or passing a laser beam emitted from said laser; means for producing a monitoring beam based on said laser beam; a beam splitter for splitting said laser beam through said shutter and said monitoring beam into two beams, respectively; means for producing an object beam from one of said two beams into which said laser beam is split and a monitoring object beam from one of said two beams into which said monitoring beam is split; means for producing a reference beam from the other of said two beams into which said laser beam is split and a monitoring reference beam from the other of said two beams into which said monitoring beam is split; a hologram plate for forming interference patterns thereon based on an interference phenomenon of said object beam and said reference beam incident thereon to record said hologram thereon and for recording a monitoring hologram on a portion thereof to form monitoring interference patterns based on an interference phenomenon of said monitoring object beam and said monitoring reference beam incident thereon; an optical sensor for sensing an intensity of said monitoring interference patterns of said monitoring hologram; intensity comparing means for comparing the intensity of said monitoring interference patterns sensed by said optical sensor with a reference intensity; shutter driving means for turning on/off said shutter in response to an output signal from said intensity comparing means; and display means for displaying the intensity of said monitoring interference patterns sensed by said optical sensor.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENT

Figure 1:
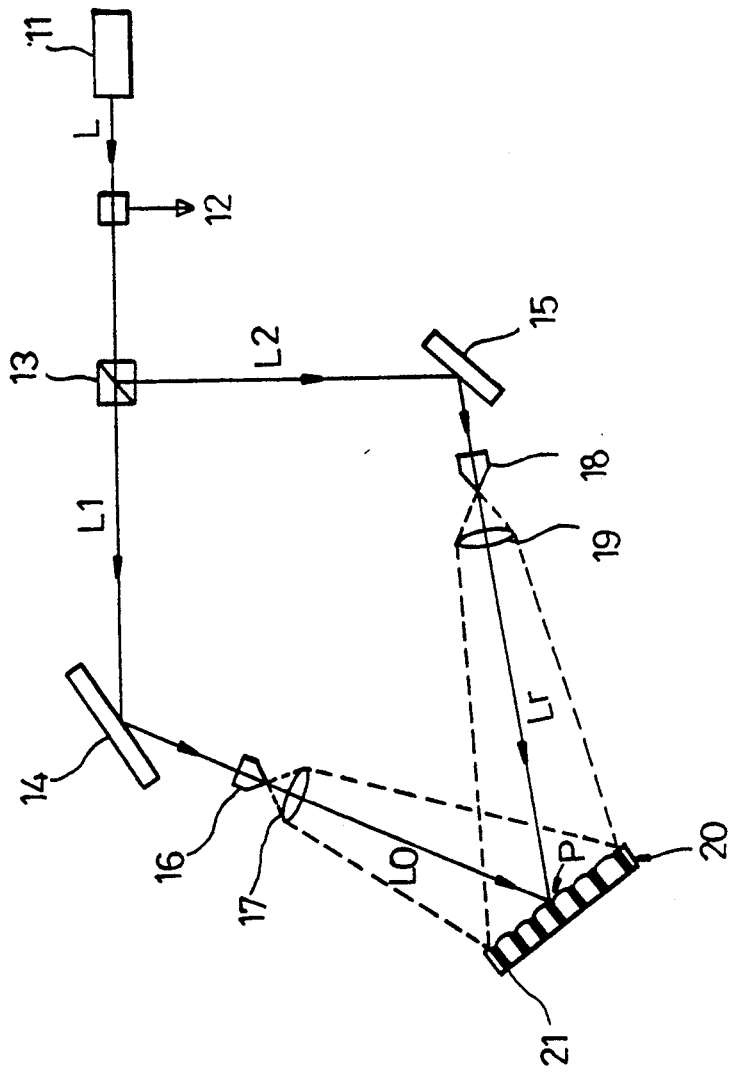
FIG. 1 shows an arrangement of a conventional apparatus for making a transmissive hologram.
Figure 2:
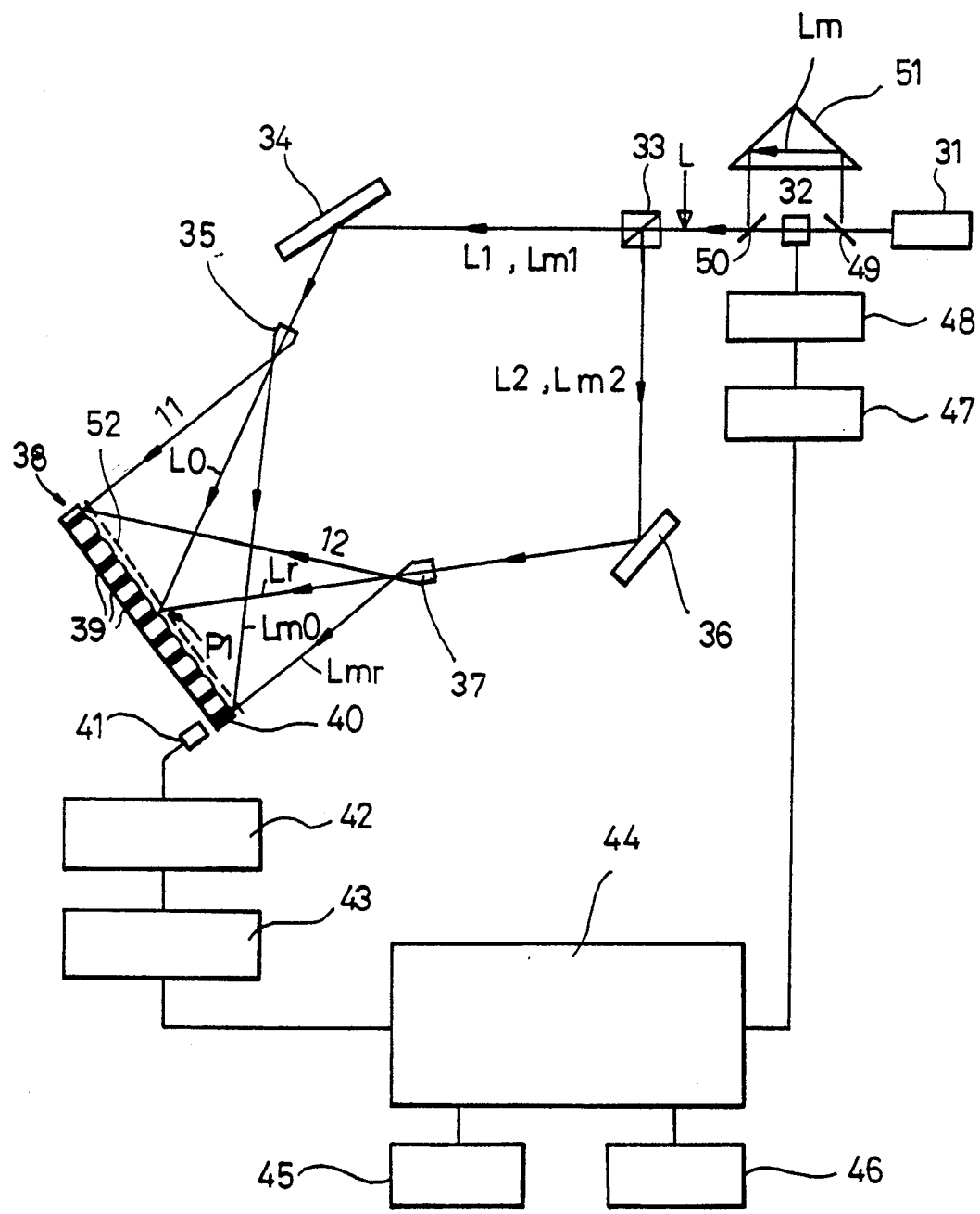
FIG. 2 shows an arrangement of an apparatus for making a transmissive hologram in accordance with the present invention.

Referring to FIG. 2, there is shown an arrangement of an apparatus for making a transmissive hologram in accordance with the present invention. As shown in this figure, the apparatus of the present invention comprises a laser 31 as a light source, a shutter 32, a beam splitter 33, monitoring beam producing means, object beam producing means, reference beam producing means, a hologram plate 38, an optical sensor 41, intensity comparing means, display means 45 and shutter driving means.

The shutter 32 serves to block or pass a laser beam L emitted from the laser 31 in response to a shutter drive signal from the shutter driving means.

The monitoring beam producing means includes a partial reflection mirror 49 for partially reflecting the laser beam L from the laser 31 to produce a monitoring beam Lm, a right prism 51 for reflecting the partially reflected beam or the monitoring beam Lm at an angle of 90°, and a partial reflection mirror 50 for reflecting the 90°-reflected monitoring beam Lm such that the monitoring beam Lm is combined with the laser beam L through the shutter 32.

The beam splitter 33 acts to split the laser beam L through the shutter 32 into two beams L1 and L2 and to split the monitoring beam Lm into two beams Lm1 and Lm2.

The object beam producing means includes a reflection mirror 34 for reflecting the beams L1 and Lm1 split by the beam splitter 33 at any desired angles, and a beam expander 35 for producing an object beam Lo and a monitoring object beam Lmo by expanding diameters of the reflected beams L1 and Lm1 to allow the reflected beams L1 and Lm1 to light the whole surface of the hologram plate 38 and a monitoring hologram 40 area of the hologram plate 38, respectively.

The reference beam producing means includes a reflection mirror 36 for reflecting the beams L2 and Lm2 splitted by the beam splitter 33 at any desired angles, and a beam expander 37 for producing a reference beam Lr and a monitoring reference beam Lmr by expanding diameters of the reflected beams L2 and Lm2 to allow the reflected beams L2 and Lm2 to light the whole surface of the hologram plate 38 and the monitoring hologram 40 area of the hologram plate 38, respectively.

The hologram plate 38 forms interference patterns 39 thereon based on an interference phenomenon of the object beam Lo and the reference beam Lr incident thereon, to record the hologram. Also formed on a portion of the hologram plate 38 is the monitoring hologram 40 based on the interference phenomenon of the object beam Lo and the reference beam Lr. The monitoring hologram 40 is provided to form monitoring interference patterns based on an interference phenomenon of the monitoring object beam Lmo and the monitoring reference beam Lmr incident thereon.

The optical sensor 41 senses a variation in an intensity of the monitoring interference patterns of the monitoring hologram 40, or a variation in an intensity of the interference patterns 39, as will be described in detail later.

The intensity comparing means serves to check whether the intensity of the monitoring interference patterns of the monitoring hologram 40 sensed by the optical sensor 41 is varied exceeding a predetermined value and includes an amplifier 42 for amplifying an output signal from the optical sensor 41, an analog/digital converter 43 for converting an analog output signal from the amplifier 42 into a digital signal, an input unit 46 for inputting a tolerance limit $\Delta I$ of the intensity variation, and a central processing unit 44 for comparing an output signal from the analog/digital converter 43 with the tolerance limit $\Delta I$ of the intensity variation through the input unit 46 to check whether the intensity of the monitoring interference patterns, or the intensity of the interference patterns 39 is varied within the tolerance limit $\Delta I$ of the intensity variation.

The shutter driving means acts to drive the shutter 32 in response to an output signal from the central processing unit 44 and includes a switch 47 for outputting the shutter drive signal in response to the output signal from the central processing unit 44 and a shutter driver 48 for turning on/off the shutter 32 in response to the shutter drive signal from the switch 47.

The display means 45 serves to input through the microcomputer 44 the output signal from the analog/digital converter 43 or the intensity of the monitoring interference patterns, or the intensity of the interference patterns 39 and display it.

In accordance with the preferred embodiment of the present invention, the optical sensor 41 may be a photodiode.

A method of making the transmissive hologram in accordance with the present invention comprises the steps of recording the monitoring hologram 40 on the hologram plate 38, sensing the variation in the intensity of the monitoring interference patterns of the monitoring hologram 40 and recording the hologram on the hologram plate 38.

The method of making the transmissive hologram in accordance with the present invention will hereinafter be described in detail with reference to FIG. 3, which is illustrated production of the monitoring interference patterns of the monitoring hologram 40 and sensing of the variation in the intensity thereof in making the transmissive hologram in accordance with the present invention.

There will first be described the step of recording the monitoring hologram 40 on the hologram plate 38. The laser beam L emitted from the laser 31 is applied through the shutter 32 to the beam splitter 33 which splits the laser beam L into the two beams L1 and L2, which are then altered into the object beam Lo and the reference beam Lr, respectively, through the reflection mirrors 34 and 36 and the beam expanders 36 and 37.

The object beam Lo and the reference beam Lr are incident on the hologram plate 38 at their desired angles. At this time, the object beam Lo and the reference beam Lr are incident only on the area of the hologram plate 38 on which the monitoring hologram 40 is to be formed, because of the presence of a screening film 52 on the hologram plate 38. As a result formed on the portion of the hologram plate 38 is the interference patterns based on the interference phenomenon of the object beam Lo and the reference beam Lr. Then, as the hologram plate 38 is developed, the monitoring hologram 40 is formed only on the surface of the hologram plate 38 on which the object beam Lo and the reference beam Lr have been incident. The screening film 52 used for the recording of the monitoring hologram 40 on the hologram plate 38 is removed at the step of recording the hologram on the hologram plate 38.

Next is the step of sensing the variation in the intensity of the monitoring interference patterns of the monitoring hologram 40. In this step, if the intensity of the monitoring interference patterns of the monitoring hologram 40 is varied exceeding the predetermined value, the shutter 32 is turned off to block the laser beam L emitted from the laser 31, but if the intensity is within the predetermined value, the shutter 32 is turned on to pass the laser beam L emitted from the laser 31.

The hologram plate 38 is fixed at the same position as in the step of forming the monitoring hologram 40. The laser beam L emitted from the laser 31 is applied through the shutter 32 to the beam splitter 33 which splits the laser beam L into the two beams L1 and L2.

The beam L1 splitted by the beam splitter 33 is reflected at its desired angle by the reflection mirror 34 and the diameter thereof is expanded by the beam expander 35 so that the incident area thereof is expanded, thereby allowing the beam L1 to become the object beam Lo. Similarly, the beam L2 split by the beam splitter 33 is reflected at its desired angle by the reflection mirror 36 and the diameter thereof is expanded by the beam expander 37 so that the incident area thereof is expanded, thereby allowing the beam L2 to become the reference beam Lr.

As a result of the removal of the screening film 52, the object beam Lo and the reference beam lr are incident on the whole surface of the hologram plate 38.

On the other hand, the laser beam L from the laser 31 is partially reflected by the partial reflection mirror 49 for production of the monitoring beam Lm. The partially reflected laser beam is the monitoring beam Lm. The partially reflected beam or the monitoring beam Lm is reflected at an angle of 90° by the right prism 51 and again reflected by the partial reflection mirror 50 such that the monitoring beam Lm is combined with the laser beam L through the shutter 32 to travel approximately the same path as that of the laser beam L.

In a similar manner to that of the laser beam L, the monitoring beam Lm is applied to the beam splitter 33 which splits the laser beam Lm into the two beams Lm1 and Lm2, which are then altered into the monitoring object beam Lmo and the monitoring reference beam Lmr, respectively, through the reflection mirrors 34 and 36 and the beam expanders 36 and 37.

The monitoring object beam Lmo and the monitoring reference beam Lmr are incident on the monitoring hologram 40 area of the hologram plate 38 in a different manner from that of the object beam Lo and the reference beam Lr. This can be accomplished by adjusting reflection angles of the reflection mirrors 34 and 36.

Figure 3:
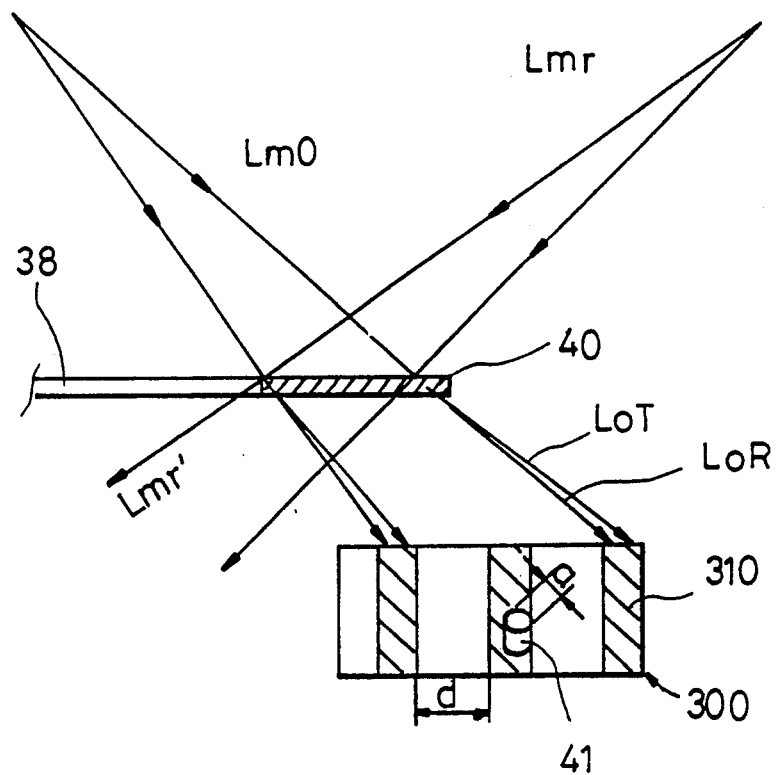
FIG. 3 is a view illustrating production of monitoring interference patterns of a monitoring hologram and sensing of a variation in an intensity thereof in making the transmissive hologram in accordance with the present invention.

As shown in FIG. 3, when the monitoring reference beam Lmr is incident on the monitoring hologram 40 area of the hologram plate 38, an object beam $L_{OR}$ is reproduced which has the same wave front as that of the monitoring object beam Lmo, in accordance with the principles of the hologram. Also, when the monitoring object beam Lmo is incident on and transmitted through the monitoring hologram 40 area of the hologram plate 38, a transmissive object beam $L_{OT}$ is formed. Monitoring interference patterns 300 are formed due to an interference phenomenon of the reproduced object beam $L_{OR}$ and the transmissive object beam $L_{OT}$. A series of black and dark portions, or the monitoring interference patterns 300 can be observed by putting monitoring screens 310 into the corresponding positions, thereby enabling an intensity distribution of the monitoring interference patterns 300 to be observed.

In FIG. 3, assuming that d is a distance between adjacent ones of the interference patterns 300 or the black portions and a is a diameter of the optical sensor 41, the distance d may be much lager than the diameter a of the optical sensor 41 by finely adjusting the positions of the partial reflection mirrors 49 and 50, thereby enabling the intensity distribution of the monitoring interference patterns 300 to be observed more and more readily.

The optical sensor 41 receives a constant, initial intensity Io of the monitoring interference patterns 300 and senses the variation in the intensity of the interference patterns 39 to be recorded on the hologram plate 38, as a result of sensing the variation in the intensity of the monitoring interference patterns 300.

The variations in the intensities of the interference patterns 39 and 300 are in accord with each other, because the laser beam L through the shutter 32 and the monitoring beam Lm are altered into the object beams Lo and Lmo and the reference beams Lr and Lmr, respectively, along the same path. That is, the laser beam L through the shutter 32 and the monitoring beam Lm are subject to the same external disturbance. The interference patterns 39 to be recorded on the hologram plate 38 is so fine that the optical sensor 41 has difficulty in sensing the variation in the intensity thereof. For this reason, the optical sensor 41 senses the variation in the intensity of the interference patterns 39, as a result of sensing the variation in the intensity of the monitoring interference patterns 300. The travelling of the interference patterns 39 due to the external disturbance can be sensed based on the sensed intensity variation. As a result, a control can be performed to minimize the travelling of the interference patterns 39 due to the external disturbance.

Next will then be described a step of controlling the shutter 32 according to the sensed intensity variation to minimize the travelling of the interference patterns 39 due to the external disturbance. Recording the hologram on the hologram plate 38 without any travelling of the interference patterns 39 can be accomplished by the driving of the shutter 32 only at the moment that the interference patterns 39 are fixed, or the intensity sensed by the optical sensor 41 is maintained as the constant initial value Io. In other words, since the initial intensity Io has an analog value, the shutter 32 is opened for exposure only when the sensed intensity is within the limits of the initial intensity Io.

The intensity signal of the monitoring interference 300 sensed by the optical sensor 41 is amplified by the amplifier 42 and applied to the analog/digital converter 43, which converts the analog intensity signal into a digital signal and applies the digital signal to the central processing unit 44.

The central processing unit 44 compares the intensity of the monitoring interference patterns 300 or the intensity I(P1) of the interference patterns 39 sensed at a point P1 on the hologram plate 38 with the tolerance limit ΔI of the intensity variation inputted through the input unit 46. If the intensity I(P1) of the interference patterns 39 is within the limits of an equation (4) below as a result of the comparison, the central processing unit 44 outputs a signal for turning on the shutter 32 for a predetermined time period T1. If not, the central processing unit 44 outputs a signal for turning off the shutter 32.

$$Io - \Delta I < I(P1) < Io + \Delta I \qquad (4)$$

In response to the output signal from the central processing unit 44, the switch 47 and the shutter driver 48 are operated to drive the shutter 32.

If the intensity of the interference patterns 39 with no travelling due to the external disturbance sensed by the optical sensor 41 is within the limits of the above equation (4), the shutter 32 is turned on for the predetermined time period T1. If not, the shutter 32 is turned off. Although the shutter 32 has been turned off because of the external disturbance, the intensity variation is sensed continuously through the monitoring hologram 40. Namely, although the shutter 32 has been turned off, the monitoring beam Lm is applied through the partial reflection mirrors 49 and 50 and the right prism 51 to the beam splitter 33 which splits the monitoring beam Lm into the two beams Lm1 and Lm2, which are then altered into the monitoring object beam Lmo and the monitoring reference beam Lmr, respectively, as mentioned above. These beams Lmo and Lmr are incident on the monitoring hologram 40 to allow the monitoring interference patterns to be formed thereon based on the interference phenomenon thereof. Accordingly, the optical sensor 41 can continuously sense the variation in the intensity of the interference patterns through the monitoring hologram 40 regardless of the operation of the shutter 32.

If the intensity I(P1) comes again in the limits of the equation (4) during the continuous sensing for the intensity variation, the shutter 32 is turned on for exposure for a predetermined time period T2. In this manner, the turning-on/off of the shutter 32 are repeated until the repeated total time, i.e., T1+T2+... Tn reaches an exposure time T required in making the hologram. When the repeated total time reaches the exposure time, the shutter 32 is turned off and the hologram is recorded on the hologram plate 38.

Figure 4:
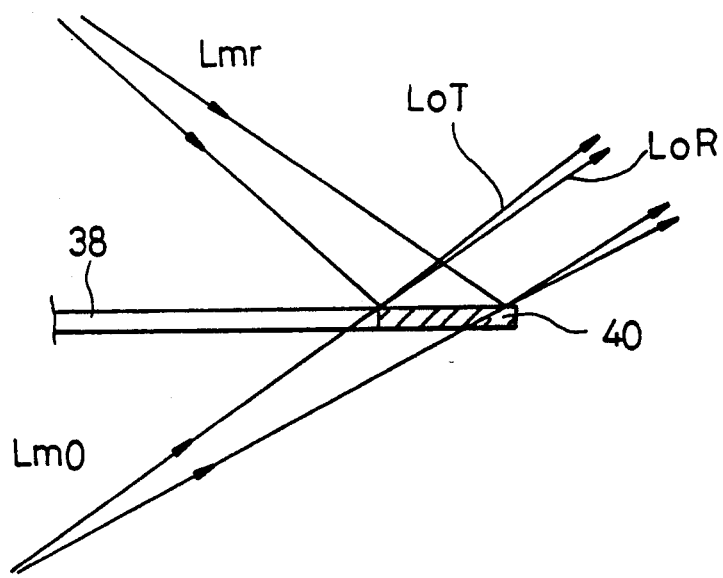
FIG. 4 is a view illustrating production of monitoring interference patterns of a monitoring hologram and sensing of a variation in an intensity thereof in making a reflective hologram in accordance with the present invention.

On the other hand, the present invention may be employed in making a reflective hologram as shown in FIG. 4. The construction in FIG. 4 is identical to that in FIG. 3, except that the object beam and the reference beam are incident in different directions on the hologram plate. Therefore, the present invention may be applied in making the hologram without respect to the type of media for recording the hologram.

As hereinbefore described, according to the present invention, the travelling of the interference patterns due to the external disturbance can be sensed through the monitoring hologram, thereby enabling the hologram of high quality to be made regardless of the external disturbance. Therefore, the shutter can be exposed regardless of a cause of the variation in the intensity of the interference patterns. This enables a hologram requiring a long time exposure to be made regardless of a low power laser or circumstances. The present invention may be applied to the production of a hologram element for a holographic laser scanning unit or for a bar code reader.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. A method of making a hologram, comprising the steps of:
   forming a monitoring hologram on a portion of a hologram plate;
   producing a monitoring beam based on a laser beam;
   splitting said laser beam and said monitoring beam into two beams, respectively;
   producing an object beam and a reference beam to be incident on a whole surface of said hologram plate from said two beams into which said laser beam is split and a monitoring object beam and a monitoring reference beam to be incident on said monitoring hologram on said hologram plate from said two beams into which said monitoring beam is split;
   allowing said monitoring object beam and said monitoring reference beam to be incident on said monitoring hologram on said hologram plate to form monitoring interference patterns;
   sensing an intensity of said monitoring interference patterns;
   comparing the sensed intensity of said monitoring interference patterns with a reference intensity and if the intensity of said monitoring interference patterns varies exceeding a tolerance limit of intensity variation, blocking said laser beam and allowing said monitoring object beam and said monitoring reference beam to be incident on said monitoring hologram on said hologram plate and if the intensity of said monitoring interference patterns varies within the tolerance limit of intensity variation, allowing said object beam and said reference beam to be incident on said hologram plate; and
   performing repeatedly said sensing and comparing steps so that said object beam and said reference beam are incident on said hologram plate only for a predetermined time period to record said hologram based on an interference phenomenon thereof.

2. The method of claim 1, wherein said step of forming said monitoring hologram includes the steps of:
   splitting said laser beam into said two beams;
   producing said object beam and said reference beam from said two beams into which said laser beam is split; and
   allowing said object beam and said reference beam to be incident only on said portion of said hologram plate to form interference patterns based on the interference phenomenon thereof.

3. The method of claim 1, wherein said step of producing said object beam, said reference beam, said monitoring object beam, and said monitoring reference beam includes the steps of:
   reflecting said split beams at desired angles, respectively; and
   expanding diameters of the reflected beams.

4. The method of claim 1, wherein said step of producing said monitoring beam includes the steps of:
   partially reflecting said laser beam;
   reflecting the partially reflected laser beam at an angle of 90°; and
   reflecting the 90°-reflected laser beam again such that it is combined with said original laser beam.

5. The method of claim 1, wherein said comparing step includes the steps of:
   determining the reference intensity as an analog value;
   amplifying the sensed intensity of said monitoring interference patterns;
   converting the amplified intensity into a digital intensity value; and
   comparing the digital intensity value with the reference intensity.

6. The method of claim 1, wherein if the sensed intensity of said monitoring interference patterns is I(P1), the reference intensity is Io and the tolerance limit of the intensity variation is I, said object beam and said reference beam are incident on said hologram plate only when the sensed intensity I(P) is within $$Io - \Delta I < I(P1) < Io + \Delta I.$$

7. The method of claim 1, wherein said monitoring interference patterns are formed based on an interference phenomenon of a reproduced object beam and a transmissive object beam, said reproduced object beam being formed by allowing said monitoring reference beam to be incident on said monitoring hologram, said transmissive object beam being formed by allowing said monitoring object beam to be transmitted through said monitoring hologram.

8. The method of claim 7, wherein said reproduced object beam has the same wave front as that of said monitoring object beam incident on said monitoring hologram.

9. An apparatus for making a hologram, comprising:
   a laser as a light source;
   a shutter for blocking or passing a laser beam emitted from said laser;

means for producing a monitoring beam based on said laser beam;

a beam splitter for splitting said laser beam through said shutter and said monitoring beam into two beams, respectively;

means for producing an object beam from one of said two beams into which said laser beam is split and a monitoring object beam from one of said two beams into which said monitoring beam is split;

means for producing a reference from the other of said two beams into which said laser beam is split and a monitoring reference beam from the other of said two beams into which said monitoring beam is split;

a hologram plate for forming interference patterns thereon based on an interference phenomenon of said object beam and said reference beam incident thereon to record said hologram thereon and for recording a monitoring hologram on a portion thereof to form monitoring interference patterns based on an interference phenomenon of said monitoring object beam and said monitoring reference beam incident thereon;

an optical sensor for sensing an intensity of said monitoring interference patterns of said monitoring hologram;

intensity comparing means for comparing the intensity of said monitoring interference patterns sensed by said optical sensor with a reference intensity;

shutter driving means for turning on and off said shutter in response to an output signal from said intensity comparing means; and display means for displaying the intensity of said monitoring interference patterns sensed by said optical sensor.

10. The apparatus of claim 9, wherein said monitoring beam producing means includes:

a first partial reflection mirror for partially reflecting said laser beam from said laser;

a right prism for reflecting the partially reflected laser beam at an angle of 90°; and a second partial reflection mirror for reflecting the 90°-reflected laser beam such that it is combined with said laser beam through said shutter to travel the same path as that of said laser beam.

11. The apparatus of claim 9, wherein said object beam and monitoring object beam producing means includes:

a reflection mirror for reflecting the one of said two beams into which said laser beam is split through said beam splitter and the one of said two beams into which said monitoring beam is split through said beam splitter; and a beam expander for expanding diameters of the beams reflected by said reflection mirror.

12. The apparatus of claim 9, wherein said reference beam and monitoring reference beam producing means includes:

a reflection mirror for reflecting the other of said two beams into which said laser beam is split through said beam splitter and the other of said two beams into which said monitoring beam is through said beam splitter; and a beam expander for expanding diameters of the beams reflected by said reflection mirror.

13. The apparatus of claim 9, wherein said intensity comparing means includes:

an amplifier for amplifying the intensity of said monitoring interference patterns sensed by said optical sensor;

an analog/digital converter for converting an analog output signal from said amplifier into a digital signal;

an input unit for providing a tolerance limit of the intensity variation; and a central processing unit for comparing an output signal from said analog/digital converter with the tolerance limit of the intensity variation input through said input unit.

14. The apparatus of claim 9, wherein said optical sensor is a photodiode.

15. The apparatus of claim 9, wherein said shutter driving means includes:

a switch for outputting a signal for turning on said shutter in response to an output signal from said intensity comparing means indicating that the intensity of said monitoring interference patterns is varied within a tolerance limit of the intensity variation and outputting a signal for turning off said shutter in repone to an output signal from said intensity comparing means indicating that the intensity of said monitoring interference patterns is varied exceeding the tolerance limit of the intensity variation; and a shutter driver for turning on and off said shutter in response to an output signal from said switch.

16. The apparatus of claim 9, wherein said optical sensor has a diameter smaller than a distance adjacent ones of said monitoring interference patterns.

* * * * *